July 3, 1934.  W. H. GIBB  1,965,312
WELDING MACHINE
Filed July 23, 1931  2 Sheets-Sheet 1

Inventor:
William H. Gibb.
by Emery, Booth, Varney & Townsend
Attys

July 3, 1934. W. H. GIBB 1,965,312
WELDING MACHINE
Filed July 23, 1931 2 Sheets-Sheet 2

Inventor:
William H. Gibb,
by Emery Booth Varney & Townsend
Attys.

Patented July 3, 1934

1,965,312

UNITED STATES PATENT OFFICE 1,965,312

WELDING MACHINE

William H. Gibb, Bay City, Mich., assignor to Thomson-Gibb Electric Welding Company, Lynn, Mass., a corporation of Massachusetts Application July 23, 1931, Serial No. 552,606

13 Claims. (Cl. 219—4)

This invention relates to electric welding and more particularly to electric resistance line or seam welding of sheet-metal, the object of the invention, among other things, being to increase the assurance of uniformity in the welded seam.

Uniformity of product in resistance seam welding depends in large measure on uniformity, not only in the welding heat but in the pressure applied through the welding electrodes, and in the speed of the weld, that is to say, the rate at which relative movement takes place between the electrodes and the work. On the other hand, the welding heat itself depends not only on the proper current control through the voltage regulation, but also on the pressure exerted by the electrodes on the work and on the speed of the weld. Unless these several variables are co-related and maintained in some appropriate and approximately fixed relation a non-uniform welding will result.

One source of variation in the welded product is the gradual diminution through wear and usage in the size of the feed rollers, which in seam welding also frequently function as the electrodes. The edge faces of these electrode rollers being forced under pressure against the work are subject to wear so that their outside diameters become gradually reduced, resulting in a reduction of their peripheral speed and in the speed of the weld, destroying the co-relation which should be maintained between the welding heat, the pressure and the welding speed. And this condition may be and usually is unknown to or unobservable by the operator except as it is manifested in the repeated output of an improperly welded product.

One object of the invention is to provide means whereby change in the diametrical dimensions of the driven feed roller or rollers may be readily brought to the attention of the operator, this being combined with variable speed transmission devices so related to the rolls that the necessary co-related change may be made in the rotative speed of the roll to maintain its peripheral speed at substantially the correct rate for the welded work which is being operated on by the machine.

Another object of the invention is to provide means whereby the pressure exerted by the electrode may be properly related to the speed and the current and may be checked from time to time to be certain that proper pressure conditions are being preserved under changing conditions such as are occasioned by the wear of the electrodes.

These and other objects of the invention will be apparent from the following description taken in connection with the accompanying illustration of one specific embodiment of the same, while the scope will be more particularly pointed out in the appended claims.

Figure 1:
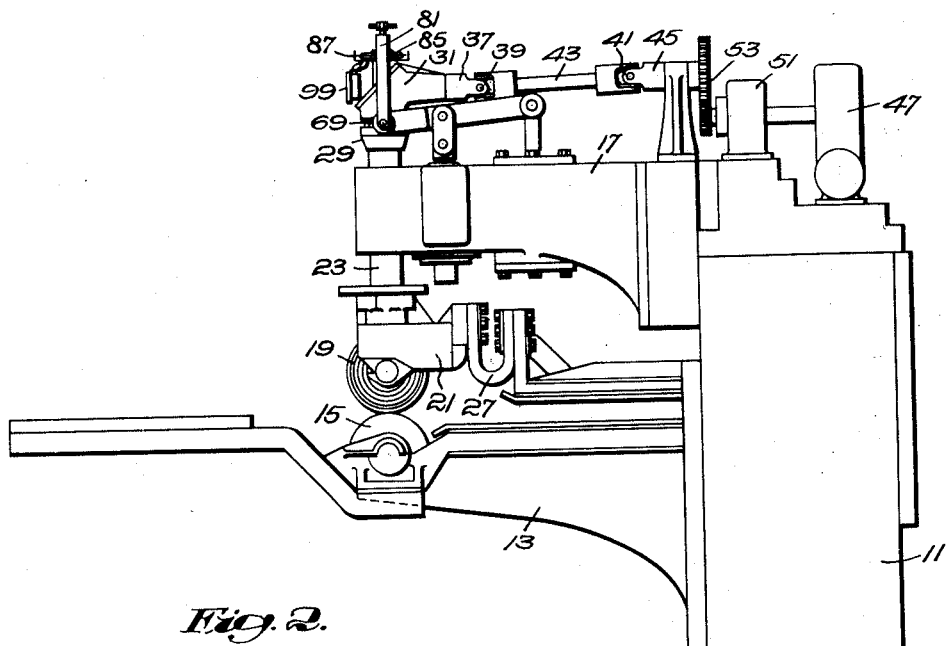
Fig. 1 is a side elevation of an electric resistance seam welding machine equipped with one form of the invention.

Referring to the drawings and to the embodiment of the invention there shown for illustrative purposes, the welding machine has a hollow pedestal or standard 11 (Fig. 1) provided with a laterally extending arm or table 13 for supporting and guiding the work and for carrying the lower electrode roller 15. Above the arm 13 there is provided the overhanging complementary arm 17 carrying the upper electrode roller 19 with the operating mechanism therefor. The roller 19 is mounted in the welding head 21, the latter carried at the bottom of a plunger 23 which is guided for vertical movement in the arm 17 (Fig. 4), the roller being driven from the spindle 25 journaled in the plunger through gearing, which, with other supporting and driving elements, is conventionally represented in the drawings in Figs. 3 and 4.

The two electrode rollers are connected to opposite terminals of the secondary circuit of a welding transformer mounted within the standard 11 and provided with the usual current controlling devices, the connection to the upper roller being through looped, flexible strips 27 of conductive metal to permit the necessary raising and lowering movement of the roller, which movement needs to be only of sufficient extent to cause the upper roller when lifted to adequately clear the bulkiest work on which the machine is used. No attempt is made to show the details of the electrical connections to the rollers, or the transformer or current controlling devices, since these are well understood in the art and may be of any usual form.

To drive the spindle and impart rotary movement to the roller 19, the plunger 23 above the arm has secured to it a head 29 surmounted by and carrying a hollow gear box 31 enclosing the beveled gears 33 and 35. The gear 33 is secured to the top of the spindle 25 and the gear 35 to a short stub shaft 37 journaled in the box and having a projecting end which is coupled through universal joints 39 and 41 and the link shaft 43 to the driving shaft 45 journaled in a bracket on the arm 17 near the standard 11. These connections provide a driving connection to the spindle, while permitting the raising and lowering of the latter with the plunger.

The shaft 45 is driven from the motor 47 through the worm gear 49 and the interposed variable speed transmission device 51, the driven shaft of which is connected to the shaft 45 by a chain and sprocket driving connection 53. The motor is also employed to drive the cam shaft 55 of the circuit interrupter adapted to periodically interrupt the current in the welding circuit.

The variable speed transmission device may be of the geared, frictional or any other desired type so long as it is capable of being adjusted to transmit movement from the driving to the driven member thereof at any one of a plurality of definite but different speed ratios which may be so co-related to the different established diametrical dimensions of the electrode roller 19 that the latter will be driven at all times at substantially the same peripheral speed.

In the illustrated form of the invention, the speed transmission device comprises four sets of intermeshing gears of different gearing ratios. The driven gear of each set is fixed on its shaft, while the driving gear is loose on its shaft but may be engaged therewith by a sliding clutch member adjusted through the sliding pin 57 arranged internally within the driving shaft. The position of the sliding pin, which may be observed by some form of indicator (not illustrated), will show the speed ratio in use, there being four sets here available, the low speed designated as 1, intermediate speeds 2 and 3, and the high speed as 4.

Figure 2:
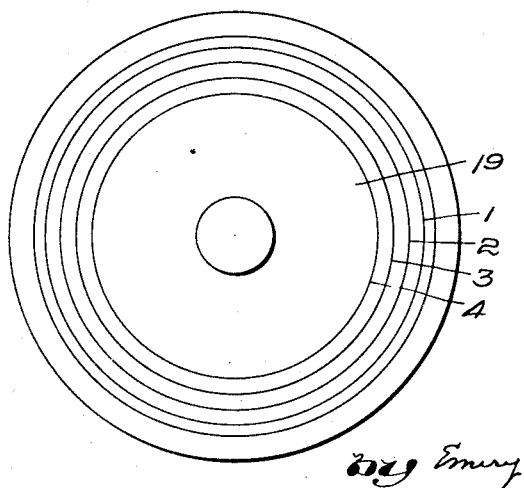
Fig. 2 is a side elevation of the upper electrode roller.

To coordinate with the speed ratios provided at the speed transmission device 19 there are also provided means at the electrode roller for indicating the effective diametrical dimension of the roller under varying or changing conditions of use. In the illustrated embodiment of the invention such means are carried by the roller itself in the form of circular scorings or grooves 2, 3 and 4 (Fig. 2) which represent each the diametrical dimension of a roller which, when driven at the speeds provided by the speed ratios 2, 3 and 4, respectively, at the speed transmission device, will in each case provide the same peripheral speed for the electrode roller and the same desired speed of weld. The outer edge of the roller designated at 1 is assumed to represent the full, undiminished size of the roller, and, when driven at the low speed ratio 1 as the speed transmission device, will produce the same peripheral speed and speed of weld as has just been referred to.

In the operation of the machine the electrode roller is initially driven using the low speed ratio 1. In the course of continued operation the roller will gradually and slowly wear, becoming of reduced diameter and the speed of weld will be correspondingly lessened. This condition, however, otherwise scarcely perceptible, is readily observable at all times by the operator, both as to the fact of wear and the amount of wear, and, when the diameter of the roll approaches more nearly the dimension represented by the scoring designated at 2, the speed change mechanism is reset to provide the corresponding but higher intermediate gearing ratio 2. Similar readjustments are made when a diameter corresponding to the scorings 3 and 4 is reached. A close approximation to a constant peripheral speed may thus be had at all times. If a more exact conformance to a constant speed of weld is desired, a larger number of speed changes with a larger number of corresponding scorings, or other dimensional indications, may be employed so as to provide intermediate steps or graduations of speed. Or, with the same number of scorings, a larger number of speed changes may be used to give intermediate speeds corresponding to roller dimensions intermediate those indicated by the reference scorings. Or, if exactness of peripheral speed is essential, the roller, after being subjected to any substantial wear likely to alter its peripheral speed outside of the desired range, may be removed from the welding head and machined or turned down to the exact diameter indicated by the next similar circular scoring.

To co-relate the pressure exerted by the electrodes against the work to the speed of weld, there is provided in the illustrated embodiment of the invention means for adjusting pressure combined with a pressure indicator which is adapted to show the pressure to which the electrodes have been adjusted, thereby to assist in setting the machine for the welding pressure suited to the particular gauge or character of work to be welded, and to insure uniformity of pressure for the same class of work by showing any deviation therefrom which may result from wear of the electrodes or other changed conditions. It also serves to secure a close adjustment of welding pressure to exact requirements which should be adhered to particularly in the case of welding non-ferrous metals.

Figure 3:
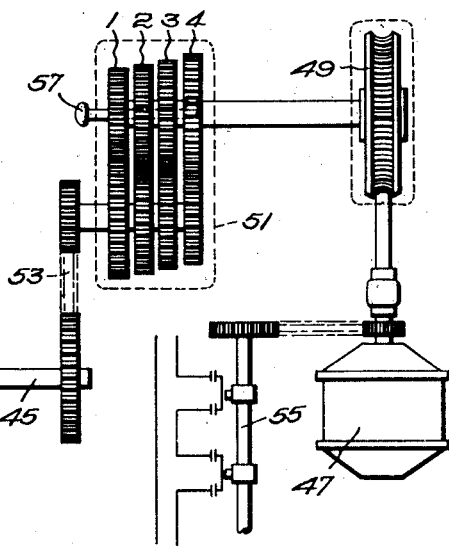
Fig. 3 is a development in partial section, more or less diagrammatic in form, showing the upper electrode roller with means for indicating its effective diametrical dimensions, together with the co-related, variable speed, driving mechanism and the pressure indicator.
Figure 4:
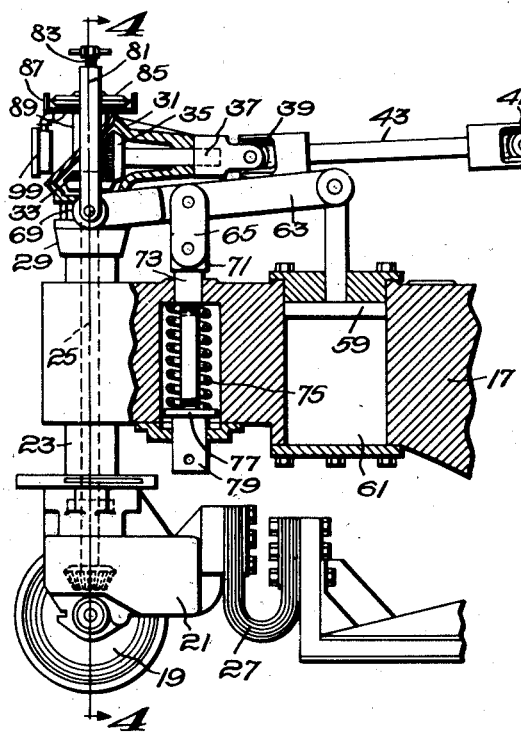
Fig. 4 is an end view in cross section, on the line 4—4 in Fig. 3, showing the means for depressing and raising the electrode roller with its associated pressure indicator.
Figure 4:
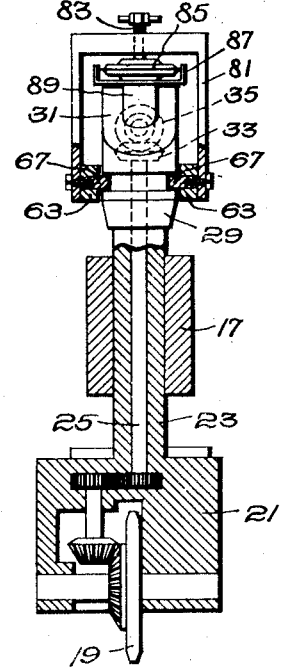

Referring to Figs. 3 and 4, the upper electrode roller 19 is raised and lowered by means of actuating mechanism which includes a vertically moving piston 59 (Fig. 3) working in a pressure fluid cylinder 61 provided in the arm 17. The piston may be actuated by any desired pressure fluid, the latter being herein assumed to be compressed air, there being utilized the necessary and usual pipe connections, valves and sources of compressed air (not shown) for raising and lowering the piston to depress and raise respectively the upper electrode.

The piston 59 is connected to one end of the lever arm 63 which is fulcrumed on the link 65, the opposite end of the lever being forked to embrace the head 29 and being provided with inturned pins 67 which engage a circumferential groove 69 in the head, the pins having a substantial clearance in the groove in a vertical sense, as indicated in Fig. 4. The electrode head 21, the plunger 23 and the head 29 constitute an electrode carrier through the vertical movement of which the electrode 19 is adapted to be advanced against and retracted from the work.

The link 65 which forms a fulcrum for the lever 63 is pivoted to a shouldered stop member 71 having the depending plunger 73 slidably mounted in the arm 17 and so related to a compression spring 75 contained with the cylinder spring chamber in the arm 17 that the spring tends to draw the shouldered stop member to a seat against the top of the arm. The spring 75, which determines and controls the amount of welding pressure, encircles an extension of the plunger 73, one end abutting against the top of the spring chamber and the other end against a washer or plate 77 which is held fixed on the plunger extension by a sleeve 79 threaded on the extension, the end of which sleeve protrudes below the arm 17 and serves as an adjusting nut, by means of which the compression on the spring and the amount of welding pressure may be adjusted to any required degree.

In the raised, idling or inactive position of the electrode roller (the parts being shown in Fig. 3 in the welding or depressed position), air is admitted to the top of the cylinder 61, depressing the piston 55 and causing the latter to swing the forked end of the lever 63 up, raising the welding head 21 and the electrode roller to the top of the welding stroke through engagement of the pins 67 with the top of the groove 69 in the head 29. The lever movement takes place about the fulcruming link 65 and the stop member 71 seats against the top of the arm 17 under the action of the compression spring as soon as air pressure is withdrawn from the bottom of the air cylinder 61, and there remains seated during the lifting of the electrode head and until the air pressure is reversed.

When the electrode roller is depressed to its active or welding position, air pressure is admitted to the bottom of the cylinder 61, raising the piston to its uppermost position (as is shown in Fig. 3), throwing the control of welding pressure into the spring unit 75, the fulcruming link 65 and stop member 71 then lifting from the seat against the action of the spring to some such position as is shown in Fig. 3.

Under these conditions, due to the clearance between the pins 67 and the groove 69, the pressure thus applied is exerted, not through the pins but through a pressure applying member in the form of a pressure metering yoke 81, the upstanding arms of which are connected at their lower ends to the forked ends of the lever 63 and the cross piece or head of which, through the action of the adjusting screw 83, bears against the top of a pressure metering member 85 which is loosely cradled or positioned in the frame 87 resting on top of an extension 89 of the head 29.

Figure 5:
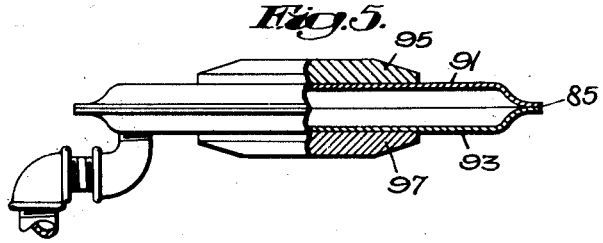
Fig. 5 is a detail showing in partial section the pressure meter employed to measure the welding pressure.

The pressure metering member (Fig. 5) comprises two complementary disc-shaped steel stampings 91 and 93 welded together at their peripheries and forming a pressure diaphragm unit equipped with top and bottom steel pads 95 and 97, the upper one of which is adapted to be engaged by the adjusting screw 83 when the electrode 19 is depressed, and the bottom of which transmits the pressure applied through the yoke 81 to the head extension 89. The diaphragm space is connected to the Bourdon tube gauge 99, calibrated in pounds, to register the pressure being applied, the sealed space provided by the diaphragm and gauge connections being filled with suitable non-compressible fluid, such as oil. When the electrode head is elevated, the clearance between the pins 67 and the grooved head 29 relieves the pressure of the contact screw 83 from the top of the gauge, the lift taking place through the pins 67. When the electrode is depressed, however, against the work, the clearance of the pins causes pressure to be applied through the diaphragm, the gauge registering accurately the applied pressure exerted by the electrodes against the work.

To initially adjust the pressure, the electrode is depressed with the work in place and the nut 79 adjusted to bring the compression spring 75 to the required degree of compression to establish the desired pressure as shown by the gauge.

If it is desired to employ the pressure meter merely for the purpose of initially setting the machine to the required welding pressure, after the pressure adjustment has been made, the diaphragm may be removed and replaced by a filler block or wedge of the same thickness as that of the diaphragm, the diaphragm being again installed when a recheck of the pressure is required.

With the diaphragm in position, however, during the welding operation, the electrode pressure is at all times observable and any change in pressure, due to any cause whatsoever, may be corrected so that a substantially uniform pressure for the same character of work may be maintained at all times.

The described machine is operated in the usual manner followed in resistance seam welding machines. The power drive is first started, establishing the rotation of the upper electrode, and the work is then placed on the lower table or arm 13 with the entering edge between the electrodes. Air is then admitted to the bottom of the cylinder 61 to compress the electrodes against the work and the current is simultaneously turned on. The work travels under the feeding action of the electrodes to the end of the seam, whereupon the current is shut off, the upper electrode raised and withdrawn by admission of air to the top of the cylinder 61, and the process is repeated with another similar piece of work.

While I have herein shown and described for the purpose of illustration one specific embodiment and application of the invention, it is to be understood that extensive deviations may be made from the described form and other applications thereof utilized, all without departing from the spirit of the invention.

I claim:

1. An automatic electric resistance seam welding machine having a driven electrode roller bearing dimensional representations identifying a succession of diminishing sizes of the effective diameter of the roller, and variable speed driving mechanism adapted to provide different speeds related one to each of the successively represented dimensions on the roller and so proportioned as to provide substantially the same peripheral speed for the roller under the successful alterations in its effective diameter denoted by said dimensional representations.

2. In an automatic resistance seam welding machine of the type having a driven electrode roller; mechanism for driving said electrode roller providing an increasing series of speeds of drive, and means dictating the selection of the speed of drive for approximate maintenance of a predetermined welding speed notwithstanding wear of the roller, said means comprising elements carried by said roller and sequentially dictating, as it is worn away, the selection, one after the other, of the speeds of said series which will most closely maintain the predetermined peripheral or welding speed of the roller.

3. An electric resistance seam welding machine having a driven electrode roller, means for indicating change through wear in the effective diametrical size of said roller, and variable speed driving mechanism for the roller, the different speeds of which are so proportioned as to provide substantially the same peripheral speed for the roller under the successive alterations in its effective diameter denoted by said indicating means, an electrode carrier, actuating mechanism to move the carrier toward and away from the work, the same including a pressure applying member, means for adjusting the welding pressure, and a pressure indicating member through which the pressure is transmitted from the pressure applying member to the electrode carrier and by which the said pressure is directly indicated.

4. An electric welding machine having a welding electrode provided with a plunger carrier, actuating mechanism to move the carrier toward and away from the work, the same including a pressure applying member, a spring controlling the welding pressure when the electrode is moved against the work, a pressure diaphragm interposed directly between the pressure applying member and the carrier through which welding pressure is transmitted, means for indicating the welding pressure, and connections between the actuating mechanism and the carrier by which the electrode is withdrawn from the work independently of the diaphragm.

5. An electric welding machine having welding electrodes, a plunger carrier for one of said electrodes adapted to be advanced and retracted to move the electrode under pressure against the work and to withdraw the same from the work, actuating mechanism including a pressure applying member, a spring controlling the welding pressure exerted by the carrier supported electrode, means for adjusting the spring to adjust the welding pressure, a pressure diaphragm interposed directly between the pressure applying member and the electrode carrier, and means for indicating the pressure actually being applied to the electrode carrier through said diaphragm.

6. An electric welding machine having welding electrodes, a plunger carrier for one of said electrodes adapted to be advanced and retracted to move the electrode under pressure against the work and to withdraw the same from the work, actuating mechanism to move the carrier, a pressure meter interposed directly between the actuating mechanism and the carrier to measure the welding pressure actually applied to said electrode carrier, and means for adjusting the welding pressure.

7. An electric welding machine having welding electrodes, a plunger carrier for one of said electrodes adapted to be advanced and retracted to move the electrode under pressure against the work and to withdraw the same from the work, actuating mechanism to move the carrier including a pressure applying member, a pressure indicator removably positionable directly between the pressure applying member and the electrode carrier and means to enable adjustment of the welding pressure with said pressure indicator in place and to enable maintenance of the adjusted welding pressure with the pressure indicator removed.

8. In an electric welding machine having a welding electrode provided with a plunger carrier, means to advance the electrode to the work comprising a movable fulcrum, a lever pivoted on said fulcrum, pressure applying means tending to move said lever about said fulcrum, means associating said lever with said plunger to advance the same longitudinally as said lever is moved, yieldable means retaining said movable fulcrum in position, and means for adjusting said yieldable means to determine the welding pressure applied to said electrode by said advancing means.

9. The combination defined in claim 8, said means associating said lever with said plunger including an indicating device for directly reading the welding pressure determined by the adjustment of said yieldable means.

10. The combination defined in claim 8, further including means for indicating the welding pressure applied to the plunger by said lever.

11. In a welding machine, the combination defined in claim 8, with the means associating said lever with said plunger for advancing the same including an indicating device for directly reading the welding pressure, and with separate means for retracting the plunger to retract the electrode from the work without strain on the indicating means.

12. The combination defined in claim 8, said fulcrum being intermediate the ends of said lever, and comprising a link pivoted to a plunger held in place by said yielding means.

13. In an electric welding machine having a welding electrode, means to advance the electrode to the work comprising a movable fulcrum, a lever pivoted on said fulcrum, pressure applying means tending to move said lever about said fulcrum, means associating said lever with the electrode to advance the same as said lever is moved, yieldable means retaining said movable fulcrum in position, means limiting the advancing range of said pressure applying means, and means for adjusting said yieldable means to determine the welding pressure applied to said electrode at the limit of advancing range of said pressure applying means.

WILLIAM H. GIBB.